United States Patent [19]

Pratt

[11] Patent Number: 5,722,574
[45] Date of Patent: Mar. 3, 1998

[54] CONTAINER AND RETAINING APPARATUS

[75] Inventor: Michael J. Pratt, Park City, Utah

[73] Assignee: Ogio International, Inc., Salt Lake City, Utah

[21] Appl. No.: 748,349

[22] Filed: Nov. 14, 1996

[51] Int. Cl.$^6$ .................................................. A45F 5/00
[52] U.S. Cl. ............................ 224/148.4; 224/148.1; 224/148.5; 224/148.6; 224/148.7; 224/249; 224/660; 248/311.21; 403/349
[58] Field of Search ..................... 224/148.1, 148.4, 224/148.5, 148.6, 148.7, 249, 660, 414; 248/311.2; 403/348, 349

[56] References Cited

U.S. PATENT DOCUMENTS

| 4,867,358 | 9/1989 | Bennis | 224/148 |
|---|---|---|---|
| 5,040,709 | 8/1991 | Neugent | 224/414 |
| 5,203,481 | 4/1993 | Dobbins et al. | 224/148 |
| 5,249,702 | 10/1993 | Topp et al. | 220/705 |
| 5,282,557 | 2/1994 | McCook | 224/148 |
| 5,294,028 | 3/1994 | Bankroff | 224/148 |
| 5,326,006 | 7/1994 | Giard, Jr. | 224/32 |
| 5,335,809 | 8/1994 | Toida et al. | 224/148.7 |
| 5,407,110 | 4/1995 | Marsh, Jr. | 224/148 |
| 5,413,261 | 5/1995 | Wu | 224/148 |
| 5,456,358 | 10/1995 | Schmidt | 206/373 |
| 5,577,647 | 11/1996 | Pittarelli et al. | 224/148.6 |

FOREIGN PATENT DOCUMENTS

| 454772 | 2/1950 | Italy | 224/30 R |

*Primary Examiner*—J. Casimer Jacyna
*Assistant Examiner*—Timothy L. Maust
*Attorney, Agent, or Firm*—Workman, Nydegger & Seeley

[57] ABSTRACT

An apparatus for securely retaining a container in place during transport yet offering ease of insertion and removal. The apparatus further facilitates blind, one-hand access to a portable fluid supply without significantly impairing the user's activity. A container portion holds and transports fluid, and is sized according to the needs of the user. The container portion is received by a retaining portion which secures the container portion to a surface such as a hip holster or a bike frame. The retaining portion and container portion securely engage with one another by way of a reciprocal connecting assembly. The reciprocal connecting assembly includes a protuberance and socket assembly which allows the container portion secure retention upon merely dropping it into the retaining portion, or, with a simple, one-handed twisting motion the container portion is virtually locked into place in the retaining portion.

20 Claims, 3 Drawing Sheets

CONTAINER AND RETAINING APPARATUS

BACKGROUND OF THE INVENTION

1. The Field of the Invention

The present invention relates generally to transport assemblies for beverage containers, and more specifically to specialized holders for securely retaining beverage containers in place.

2. The Relevant Technology

Recreational activities, and especially outdoor activities such as hiking, biking, running, and the like, have experienced a dramatic increase in popularity over the last decade. A greater knowledge concerning the interrelationship between exercise and good health has likely played a significant role in the rising interest in these activities. Today most people understand that regular exercise is linked to overall health, fitness and well-being. In turn, regular exercise has become a priority for many people.

The enhanced awareness of the benefits derived from regular exercise also promoted a revolutionary transformation in the general definition of exercise. Calisthenics in the school gym were replaced by high-impact, beat-intensive aerobics classes and flashy, crowded workout facilities. Other people opted for the outdoors where mountain-biking virtually exploded and activities such as climbing and hiking experienced a considerable revival.

Yet, health and fitness are not totally responsible for the increased participation in such outdoor recreational activities. While many people view these activities as a means to stay fit and increase longevity, others thrive on the competitive or entertainment value they offer. Nevertheless, all understand that effective participation in outdoor activities such as running or hiking requires more than just a good pair of shoes.

The human body demands a significant amount of fluid intake, particularly water, during and after exertion. Outdoor exertion necessarily requires a transportable water supply. Hikers and campers traditionally solved this problem with canteens which could be carrier over the shoulder, strapped to a belt, or stowed in a backpack. Yet, in order to access the water, the hiker had to slow or even stop the activity, hold the canteen in one hand and unscrew the lid with the other hand. This two-handed mechanism proved prohibitively cumbersome with more ambulatory activities. Moreover, it is generally undesirable to stop in the middle of mountain biking or running in order to access one's water supply, and it may even be detrimental to stop in the middle of a race or an activity where a sustained elevated heart-rate is desired.

Subsequently, squeeze bottles that enabled the user to simply squirt water into his or her mouth with the use of only one hand emerged. Still, users desired hands-free transport of the bottles. The conventional devices for transporting these bottles have included straps or clamps. The strap arrangement proved unsatisfactory because it allowed the bottle to shift or even fall. U.S. Pat. No. 5,407,110, by Marsh, Jr., hereby incorporated herein by reference, discloses such a strap arrangement. Specifically, this patent pertains to a neck strap suspension for carrying beverage containers which provides hands-free transport, but also allows the bottle to bounce around in a manner distracting or even dangerous to the wearer.

Therefore, conventional strap devices secured additional straps over the top of the bottle to prevent dislodgement. However, this arrangement proved inconvenient to operate in practice because the user often had to slow or stop to access the bottle. Further, both hands were generally required to effectively utilize the secure strapping arrangement. In turn, this arrangement prevented efficient insertion and removal of the bottle during activity.

In order to transport water during biking activities, clamps or "cages" were commonly attached to the frame of the bike to hold the bottle. One conventional clamp pinched or tightened around the bottle such that the bottle was securely attached to the frame. However, the biker ultimately had to forcefully wrench the bottle from the clamp to access the water while maintaining balance and a clear focus on the terrain ahead at the same time.

Other clamps were available which did not securely tighten around the bottle, but these allowed the bottle to become loose or even fall. For example, U.S. Pat. No. 5,294,028, by Bankroff, hereby incorporated herein by reference, discloses a container transport assembly which mounts to a bike and purports to provide for ease of insertion and removal of the beverage container. The container slides into the assembly but is not held therein by force or otherwise. In turn, this particular construction permits unwanted dislocation of the container.

SUMMARY AND OBJECTS OF THE INVENTION

It is a primary object of the present invention to provide an apparatus for securely retaining a container in place during transport yet offering ease of insertion and removal.

It is another object of the present invention to provide an apparatus which facilitates access to portable fluids without significantly impairing the user's activity.

It is yet another object of the present invention to provide an apparatus for blind, one-hand access to portable fluids.

These and other objects and features of the present invention will become more fully apparent from the following description and appended claims, or may be learned by the practice of the invention as set forth hereinafter.

To achieve the foregoing objects, and in accordance with the invention as embodied and broadly described herein, the present invention relates to a new and useful apparatus for use in securing a container for transport and the like, while offering ease of insertion and removal of the container.

The presently preferred embodiment of the present invention includes a container for holding and transporting fluid, sized according to the needs of the user. The container is received by a retaining means which secures the container to a surface such as a hip holster, a vehicle or a bike frame. The retaining means and container securely engage with one another by way of a reciprocal connecting means. The reciprocal connecting means includes a protuberance and corresponding socket assembly which allows the container to be securely retained upon merely dropping it into the retaining means. Additionally, with a simple one-handed twisting motion, the protuberance and corresponding socket assembly enables the container to be locked into place in the retaining means. This motion in reverse releases the container from the locked position, and the container naturally exits the socket assembly.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Many outdoor recreational activities limit one's access to an adequate source of water, and thus necessitate a portable water supply. Conventionally, hikers and campers have utilized canteens to carry their water supply. Canteens commonly require the use of both hands and slowing or stopping the activity to unscrew the lid and access the water.

In activities such as biking or climbing which prohibit simultaneous use of both hands to access the water supply, squeeze bottles that require the use of only one hand have commonly been used. Such activities also demand hands-free transport of the squeeze bottle, and in turn necessitate carrying devices such as straps or clamps. Strap attachments free the user's hands, but also allow unwanted and disruptive movement of the bottle. Additional straps may stabilize the bottle, but these hinder access to it. Clamping devices such as those utilized with bike frames prevent disengagement of the bottle by so tightly wedging it into the clamp that insertion and removal require an awkward, forceful motion.

The container and retaining apparatus of the present invention combine the features of secure attachment with ease of insertion and removal. The secure attachment allows the user a whole spectrum of movements that would otherwise dislodge the conventional carrying devices. The ease of insertion and removal allows swift, blind, one hand access.

Figure 1:
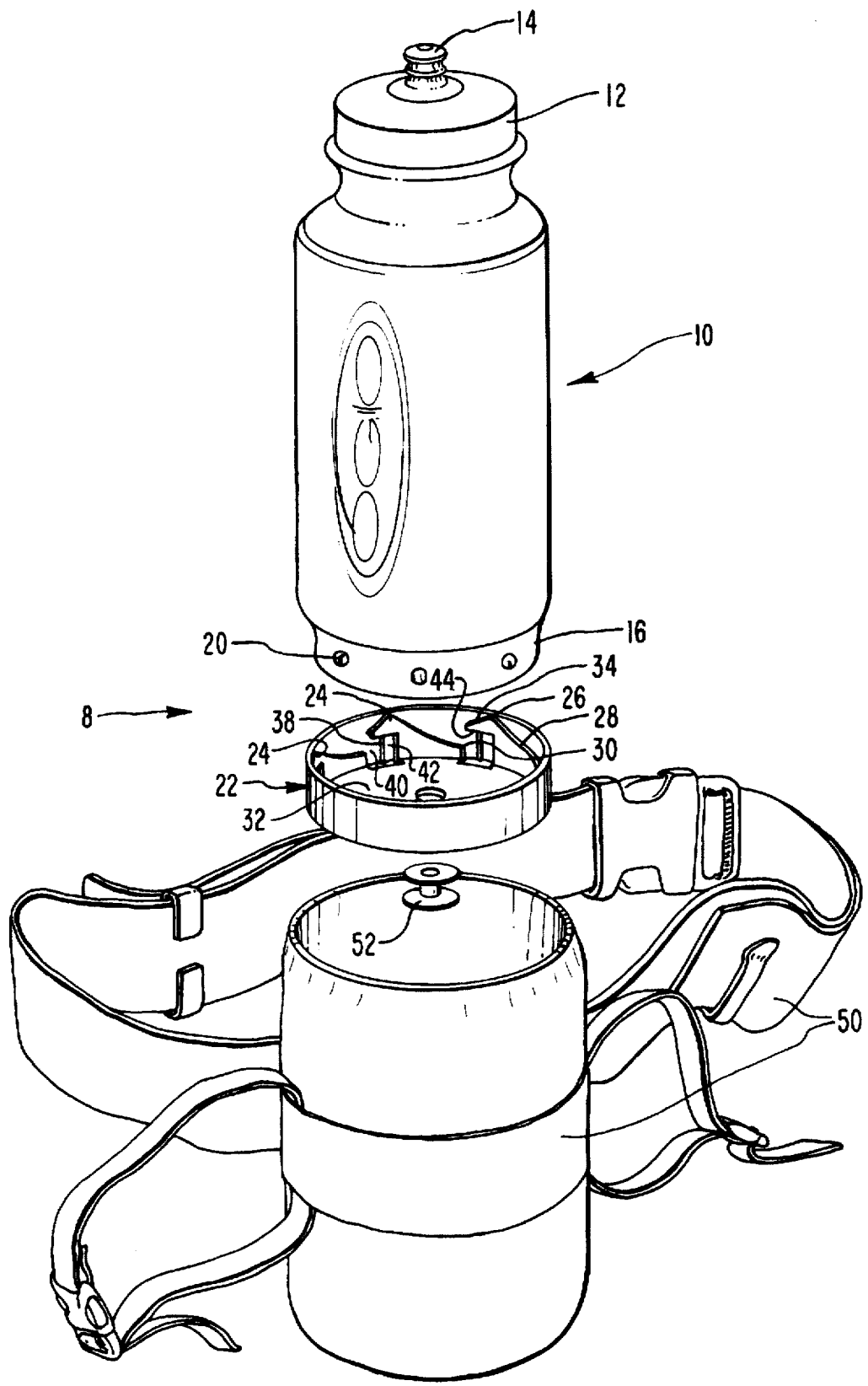
FIG. 1 is an exploded view of a presently preferred embodiment of the apparatus of the present invention.

FIG. 1 is a visual representation of the features of the present invention that solve the problems encountered with conventional devices. FIG. 1 depicts one presently preferred embodiment of an apparatus, generally labelled 8, comprising both a container portion and a retaining portion, for securing a container and facilitating ease of insertion and removal thereof.

The container portion of apparatus 8 advantageously comprises a container for holding and transporting water or other fluids. In the presently preferred embodiment of the present invention which is illustrated in FIG. 1, the container is a sport bottle 10. The preferred sport bottle includes a removable lid 12 and an adjustable spout 14, and comprises flexible material such that it can deliver fluid with a slight squeeze using only one hand. In an alternate embodiment, fluid is delivered to the user through a straw, or a sipping spout, for example. The sport bottle is preferably sized to accommodate the particular fluid requirements of the user or the activity. The preferred sport bottle comprises a substantially cylindrical shape, although other shapes could be accommodated.

It should also be appreciated that various container designs would be equally effective. For example, in an alternate embodiment, a travel mug such as the kind employed for carrying coffee could also be utilized. In this embodiment, the mug could be comprised of various materials including, but not limited to, metal, ceramics, or plastic. Further, fluid could be delivered to the user through a sipping spout, a straw, or any other lid that reduces spillage. Alternatively, the mug could even omit the lid.

The retaining portion of apparatus 8 comprises a retaining means for securing the container during transport while facilitating ease of insertion and removal of the container. In the presently preferred embodiment of the present invention which is illustrated in FIG. 1, the retaining means is a retaining base 22. The preferred retaining base comprises a semi-rigid material and a substantially annular shape, although other materials and shapes could be accommodated.

In the preferred embodiment, the retaining base 22 forms a receptacle for the sport bottle 10, and is sized accordingly. The retaining base receives the sport bottle along the edge 16 of the sport bottle distal from the lid 12. Preferably, the sport bottle slides easily into the retaining base. The distal edge 16 of the sport bottle 10 preferably has a smaller diameter than the retaining base 22. The smaller diameter facilitates the reception between the sport bottle and the retaining base. Alternatively, the distal edge of the sport bottle could slide over the retaining base.

The container is retained in the retaining means via reciprocal connector means. In a preferred embodiment, the reciprocal connector means comprises a protuberance assembly and a corresponding socket assembly.

In one embodiment the protuberance assembly comprises at least one knob. In the presently preferred embodiment which is illustrated in FIG. 1, the protuberance assembly comprises multiple knobs 20 encircling the distal edge 16 of the sport bottle. The knobs are preferably cylindrical with flat outer surfaces, and spaced equidistant from one another. Additionally, various shapes, sizes, and numbers of knobs would also be within the scope of the present invention.

In one embodiment the socket assembly comprises a synergetic ramp and cavity combination. In the presently preferred embodiment which is illustrated in FIG. 1, the socket assembly comprises multiple ramps and cavities encircling the inner rim of the retaining base 22. In particular, the retaining base 22 comprises a plurality of angular slopes 24, each of which rises to a point at the upper inside edge 26 of the retaining base 22. Each angular slope 24 is comprised of two ramps. A long ramp 28 extends from the upper inside edge 26 of the retaining base 22 and terminates abruptly in a lower edge 30 to a drop-off near the floor 32 of the retaining base. A short ramp 34 extends from the upper inside edge 26 of the retaining base in the opposite direction from the long ramp 28. The short ramp 34 terminates a slight distance from the upper inside edge 26 of the retaining base 22. The short ramp 34 additionally terminates directly above the lower edge 30 of the long ramp 28.

The gap between the termination of the short ramp 34 and the lower edge 30 of the long ramp opens into a hollow, preferably rectangular, space. Each hollow space is divided vertically by a slim detent 38 extending from the inner wall of the retaining base 22. The detent 38 forms a first cavity 40 and second cavity 42. Each cavity is sized to closely approximate the size of each knob 20 on the sport bottle 10.

Upon insertion of the sport bottle, a knob 20 on the distal edge 16 of the bottle 10 may contact either a long ramp 28 or a short ramp 34. If the knob 20 contacts the long ramp 28, it then slides downward following the slope of the long ramp 28 until the knob 20 reaches the lower edge 34 of the long ramp. The knob 20 then eases into the first cavity 40. The under-lip 44 of the short ramp 34 then acts as a barrier to prevent the bottle from dislodgment from the retaining base. A slight twist in the opposite direction of the downward slope of the long ramp 28 will free the bottle. In this reverse direction, the knob follows the natural upward slope of the long ramp.

Alternatively, the knob 20 may contact the short ramp 34 upon insertion. The knob 20 follows the short downward slope of the short ramp 34 and falls down to the lower edge of the long ramp 28. The knob then eases into the first cavity 40 and is retained as described above.

The sport bottle 10 can be even more securely attached to retaining base with an additional twist in the downward direction of the long ramp 28. This pushes the knob 20 over the detent 38 and into the second cavity 42. The second cavity 42 fits snugly around the knob 20 and prevents any unwanted movement of the bottle in the reining base, virtually locking the sport bottle into place.

In a preferred embodiment, either the knob or the detent or both need to be comprised of a flexible material such that the detent does not absolutely prohibit the knob from entering the second cavity. In a rigid embodiment of the present invention such as one substantially comprising steel, other conventional reciprocal connector means are envisioned. For example, a ball bearing in conjunction with a detent, or a spring pawl mechanism would function equivalently to the preferred knob and detent of the present invention.

Figure 3:
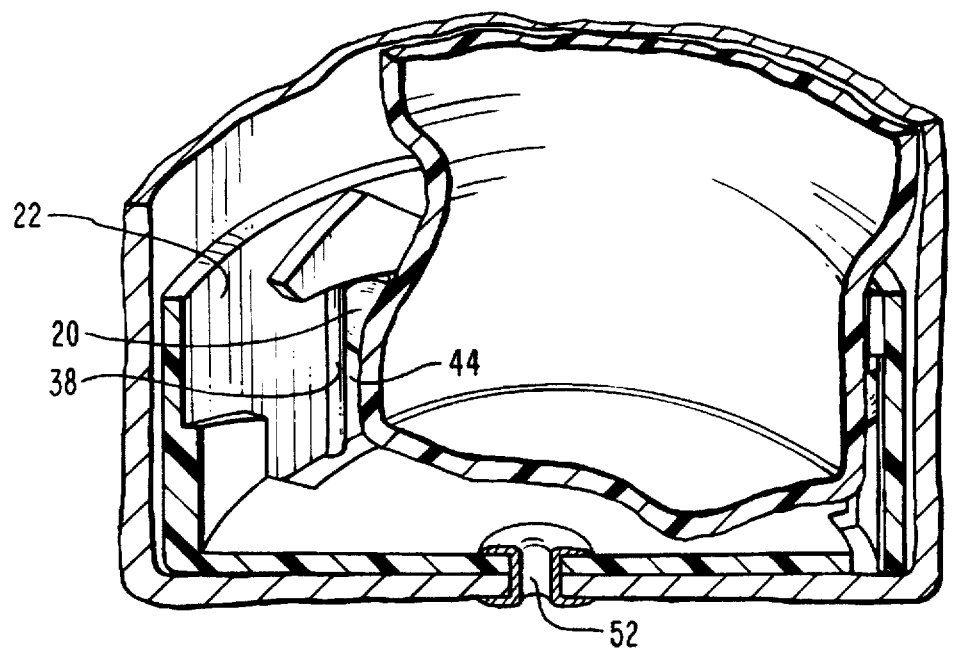
FIG. 3 is an enlarged view of the cut-away portion of FIG. 2.

FIG. 3 offers an enlarged illustration and cut-away of the aforementioned features of the present invention. The knob 20 is illustrated securely retained in the second cavity 44 of the retaining base 22. The detent 38 prevents unwanted movement of the sport bottle 10 in the retaining device.

The sport bottle is easily removed from the retaining base with a slight turn of the bottle in the upward direction of the long ramp. The sport bottle simply slides up the long ramp to upper inside edge of the retaining base. Furthermore, both insertion and removal of the sport bottle are easily accomplished with a blind, one-handed motion. The bottle may even simply be dropped down into the base. The knob will naturally slide down either ramp and into the first cavity. With a slight added twist of the bottle, the knob surpasses the detent and enters the second cavity wherein it is virtually locked into place. Alternatively, it should be appreciated that the reciprocal connector means of the present invention operate interchangeably. That is, the protuberance assembly could be employed by the retaining means, and the socket assembly could be employed by the container.

Moreover, the present invention is not restricted to a position wherein the lid of the container defines an upright position. Rather, the present invention envisions the use of the container and retaining means in an inverted manner to dispense substances such as, but not limited to, shampoos, soaps, or lotions.

FIG. 1 additionally illustrates an attachment means for seeing the retaining base to a surface. In the presently preferred embodiment depicted in FIG. 1, the attachment means comprises an eyelet 52. In this depiction, the eyelet 52 is illustrated disconnected from the retaining means 22 and the surface, a hip holster 50. The eyelet functions as vent upon insertion of the container into the retaining base such that air escapes out through the retaining means.

Figure 2:
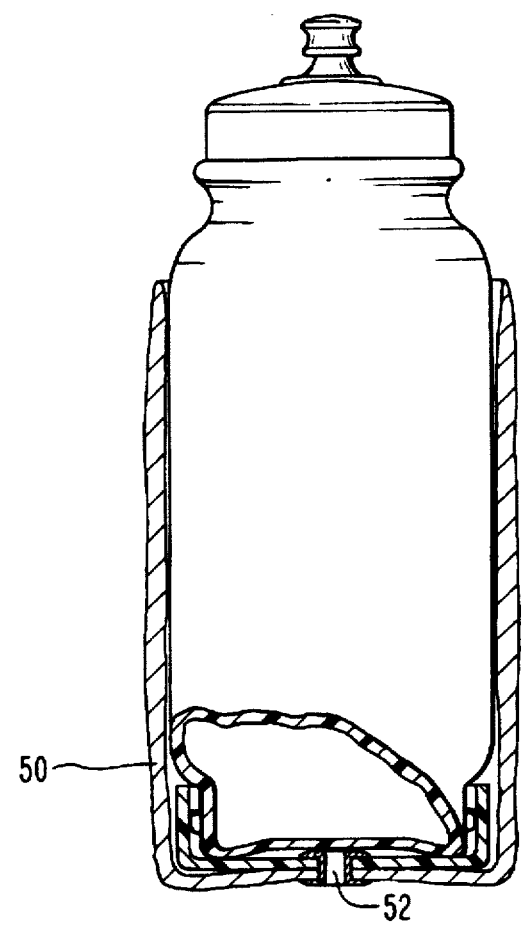
FIG. 2 is a cut-away view of the apparatus of the present invention.

FIG. 2 is an illustration of the sport bottle 10 securely retained in the retaining base 22. In the presently preferred embodiment of the present invention depicted in FIG. 2, the eyelet 52 is sewn into the retaining base and the hip holster. It should also be understood that other secure attachments would be equally effective. Adhesives, screws, welds, nails, or other fastening systems could also be utilized.

In addition, the hip holster preferably comprises a thermal material. However, the present invention is not limited to a hip holster arrangement, but may also be utilized in boats, cars, and airplanes. The retaining base could be attached to the side, dash, tray table, or other surface wherein various beverage containers could be utilized.

Figure 4:
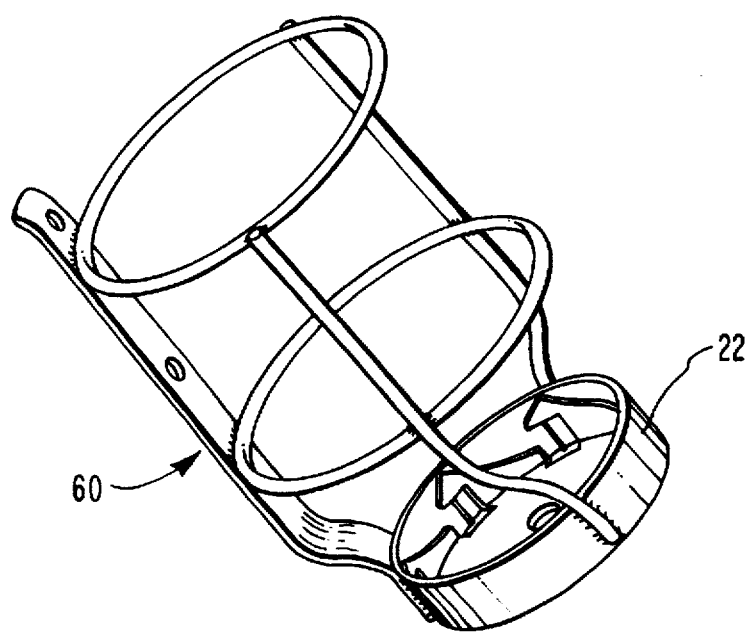
FIG. 4 is a perspective view of an alternate embodiment of the apparatus of the present invention.

Furthermore, in another embodiment of the present invention, an attachment means for fixedly attaching the retaining means to a surface is provided. In a preferred embodiment which is illustrated in FIG. 4, the attachment means is a support time 60. This support frame 60 may be securely attached to the frame of a bicycle or the side of a boat, for example.

The present invention may be embodied in other specific forms without departing from its spirit or essential characteristics. The described embodiments are to be considered in all respects only as illustrative and not restrictive. It should be understood that the container and retaining apparatus of the present invention are not limited to sport bottles held by hip holsters. The present invention would be equally useful in any circumstance where it would be beneficial to easily insert, secure, and remove a container. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An apparatus for securely retaining a container in place while facilitating removal and insertion thereof comprising:
   a. a container for containing fluid;
   b. retaining means for releasably holding said container;
   c. a protuberance assembly associated with one of said container or retaining means and a corresponding socket assembly associated with the other of said container or retaining means;
   d. said protuberance assembly having at least one outward protrusion;
   e. said corresponding socket assembly having at least one synergetic ramp and cavity combination, said corresponding socket assembly further comprising a first cavity having a ramp configured to direct said outward protrusion into the first cavity, and a second cavity for receiving said outward protrusion, said second cavity separated from the first cavity by a detent; and
   f. said outward protrusion being reversibly engageable with said socket assembly.

2. An apparatus as recited in claim 1, wherein said container is a sport bottle.

3. An apparatus as recited in claim 1, wherein said container comprises a flexible material.

4. An apparatus as recited in claim 1, wherein said container is substantially cylindrical.

5. An apparatus as recited in claim 1, wherein said retaining means comprises a substantially annular base for receiving said container.

6. An apparatus as recited in claim 1, wherein said container comprises a distal edge receivable by said retaining means.

7. An apparatus as recited in claim 6, wherein said distal edge of said container has a smaller circumference than the circumference of said retaining means.

8. An apparatus as recited in claim 1, wherein said retaining means comprises a semi-rigid material.

9. An apparatus as recited in claim 1, wherein said ramp combination comprises at least one long ramp and at least one short ramp.

10. An apparatus as recited in claim 9, wherein said long ramp extends downward from the upper inside edge of said retaining means and terminates near the lower inside edge of said retaining means.

11. An apparatus as recited in claim 9, wherein said short ramp extends downward from the upper inside edge of said retaining means in the opposite direction from said long ramp and terminates a short distance from the upper inside edge of said retaining means.

12. An apparatus as recited in claim 11, wherein said short ramp terminates directly above the termination of said long ramp.

13. An apparatus as recited in claim 1, wherein said vertical detent comprises a flexible material.

14. An apparatus as recited in claim 1, wherein said protuberance assembly comprises at least one knob.

15. An apparatus as recited in claim 14, wherein said at least one knob is substantially cylindrical with a flat outer surface.

16. An apparatus as recited in claim 14, wherein said knob comprises a flexible material.

17. An apparatus as recited in claim 1, wherein said retaining means is fixedly attached to a surface by way of a support frame.

18. An apparatus as recited in claim 1, wherein said retaining means is attached to a surface by way of a rivet.

19. An apparatus for securely retaining a container in place while facilitating removal and insertion thereof comprising:
 a. a substantially cylindrical container for containing fluid;
 b. a substantially annular retaining means for releasably holding said container;
 c. a flexible protuberance assembly associated with one of said container or retaining means and a corresponding socket assembly associated with the other of said container or retaining means;
 d. said flexible protuberance assembly having at least one substantially cylindrical outward protrusion;
 e. said corresponding socket assembly having at least one synergetic ramp and cavity combination, said corresponding socket assembly further comprising a first cavity having a ramp configured to direct said outward protrusion into the first cavity, and a second cavity for receiving said outward protrusion, said second cavity separated from the first cavity by a detent; and
 f. said outward protrusion being reversibly engageable with said socket assembly.

20. An apparatus for securely retaining a container in place while facilitating removal and insertion thereof comprising:
 a. a substantially cylindrical container comprised of flexible material for containing fluid;
 b. a substantially annular and semi-rigid retaining means for releasably holding said container;
 c. a flexible protuberance assembly associated with one of said container or retaining means and a corresponding socket assembly associated with the other of said container or retaining means;
 d. said flexible protuberance assembly having at least one substantially cylindrical outward protrusion with a flat outer surface;
 e. said corresponding socket assembly having at least one synergetic ramp and cavity combination wherein said ramp combination comprises at least one long ramp and at least one short ramp, and said cavity combination comprises at least one first cavity separated from at least one second cavity by a vertical detent; and
 f. said outward protrusion being reversibly engageable with said socket assembly.

* * * * *

UNITED STATES PATENT AND TRADEMARK OFFICE
CERTIFICATE OF CORRECTION

PATENT NO. : 5,722,574
DATED : Mar. 3, 1998
INVENTOR(S) : Michael J. Pratt

It is certified that error appears in the above-identified patent and that said Letters Patent is hereby corrected as shown below:

Col. 5, line 3, after "from" change "dislodgment" to --dislodgement--

Col. 5, line 18, before "base" change "reining" to --retaining--

Col. 5, line 46, after "place" insert a paragraph break

Col. 5, line 58, before "the" change "seeing" to --securing--

Col. 5, line 62, after "as" insert --a--

Col. 6, line 15, after "support" change "time" to --frame--

Signed and Sealed this

Fifteenth Day of December, 1998

Attest:

BRUCE LEHMAN

Attesting Officer

Commissioner of Patents and Trademarks